United States Patent [19]

Rembert et al.

[11] Patent Number: 5,601,110

[45] Date of Patent: Feb. 11, 1997

[54] MODULE LOCKING DEVICE

[75] Inventors: Michael E. Rembert, Cypress; Robert W. Milner, Katy, both of Tex.

[73] Assignee: Bettis Corporation, Waller, Tex.

[21] Appl. No.: 526,353

[22] Filed: Sep. 11, 1995

[51] Int. Cl.$^6$ .............. F16K 43/00; F01B 29/00; F01B 31/00
[52] U.S. Cl. .............. 137/316; 92/128; 92/130 C; 251/58; 251/229; 251/285; 251/288
[58] Field of Search .................. 137/315, 316; 92/128, 130 A, 130 B, 130 C, 138, 140; 251/58, 62, 229, 285, 286, 288; 267/166, 167

[56] References Cited

U.S. PATENT DOCUMENTS

| | | | |
|---|---|---|---|
| 3,187,642 | 6/1965 | Cruse | 92/128 |
| 3,727,523 | 4/1973 | Gulick | 92/130 C |
| 3,824,901 | 7/1974 | Shafer | 92/130 C |
| 4,261,546 | 4/1981 | Cory et al. | 251/58 |
| 4,350,081 | 9/1982 | Fry et al. | 92/128 |
| 4,355,566 | 10/1982 | Kaji | 251/58 |
| 4,423,748 | 1/1984 | Ellett | 92/130 C |
| 4,469,016 | 9/1984 | Butler | 251/58 |
| 4,702,150 | 10/1987 | Kaji | 92/128 |
| 4,744,386 | 5/1988 | Frazer | 92/128 |
| 5,392,807 | 2/1995 | Caudle | 137/316 |
| 5,419,361 | 5/1995 | Caudle et al. | 137/316 |

*Primary Examiner*—George L. Walton
*Attorney, Agent, or Firm*—Robert W. B. Dickerson

[57] ABSTRACT

A device used in an actuator for locking in place a spring module while under load, the device including a spring return cylinder carrying a spring under compression when under load, a spring guide, a pull rod linked to a piston in a power cylinder, and a connection linking the pull rod and the spring guide, the connection being disengageable when said spring is not under compression, but not so when under compression.

6 Claims, 6 Drawing Sheets

MODULE LOCKING DEVICE

BACKGROUND OF THE INVENTION

In the continuing development of valve actuators, the direction of such development has been toward a modular design utilizing field serviceable modules, including the power, the drive, and the spring return modules. Of paramount concern is the safety of the user. The spring may be under such compression as to store enormous forces, for example, some spring return modules of the type described herein produce spring torques in excess of 3,000,000 lb.-in. For the safety of those servicing these actuators, outside of a workshop, and persons nearby, it is essential that any stored energy in the spring not be released so as to turn any module components ballistic. To accomplish this safety feature is a principal purpose of this invention. This purpose is accomplished by locking the spring module in place while it is under load.

SUMMARY OF THE INVENTION

One end of both a piston rod and a pull rod are releasably linked to opposite sides of a guide block. This guide block carries a pin which causes oscillation of a scotch yoke device which, in turn, by virtue of its valve stem connection, causes opening and closing of a valve. The other end of the pull rod is removably seated in a recess provided in a spring guide. This spring guide recess is correlatively configured to an attachment to said other pull rod end. The spring guide is generally cup shaped with a flanged lip. The spring is seated against both the flanged lip and the inner end plate of the spring return cylinder or module. The other end of the piston rod is secured to a piston in a power cylinder. During the power stroke, the scotch yoke is normally moved to one of its extreme valve open positions and the spring is compressed. On removal of pressure from the face of the power piston, the spring returns to its original position while the yoke moves to what is normally its other extreme (valve closed) position. Each mentioned "extreme position" is governed by an adjustable stop device provided in the drive module. During normal operation, the spring remains in some compression at all times. When it is desirable to internally service the actuator, the spring must be fully extended and the pull rod attachment should be unseated. This occurs by adjusting one of the yoke stops, permitting the yoke to over rotate, i.e., past its usual (valve closed) extreme position. Since the spring guide flange in the valve closed position is already positioned against or nearly against the spring return cylinder's outer end cap, said spring guide cannot move much, if any, further. The pull rod, however can move further, thereby unseating it from the mentioned recess. This unseating permits the pull rod to be rotated thereby disengaging it from the guide block and permitting the spring return module to be removed from the drive module.

DESCRIPTION OF A PREFERRED EMBODIMENT

Figure 1:
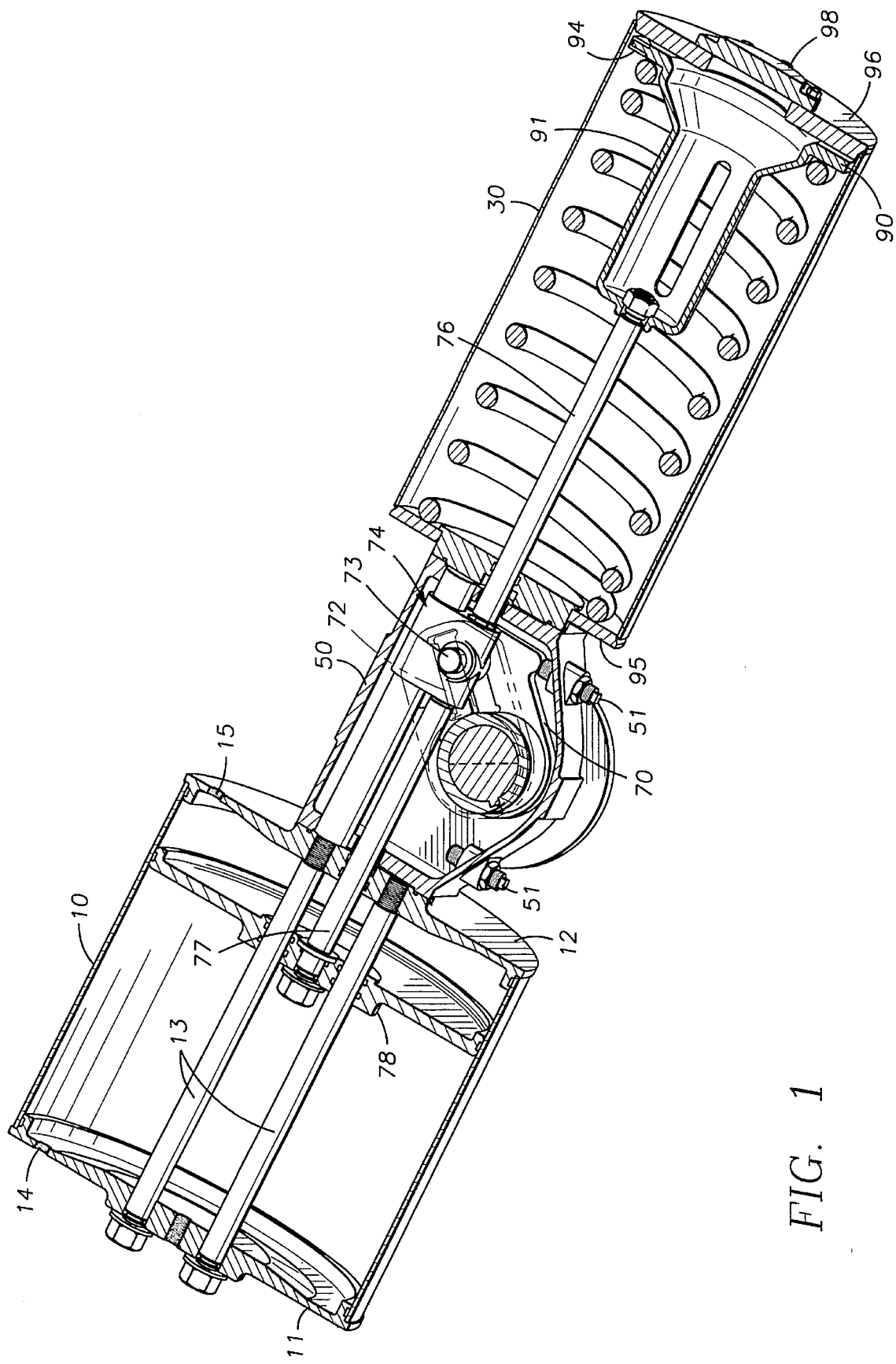
FIG. 1 is a partly broken away perspective of the assembled actuator, in the valve closed position.

Looking first at FIG. 1, a valve actuator is shown of the type sold by Bettis Corporation under its trademark ROBOTARM II. The actuator depicted includes a power module or cylinder 10, and a spring return module or cylinder 30, secured to opposite sides of a drive module 50. The drive module includes cover and bottom plates as well as end plates. These end plates are bolted (not shown) respectively to end plates 12 and 95 of the power and spring return cylinders. Rotatably mounted on the drive module is a scotch yoke device 70 having a pair of yoke arms 71 spacedly depending from rotatable hub 79. Each yoke arm is conventionally slotted at 72 so as to be rotated by longitudinal movement of yoke pin 73. This yoke pin is transversely carried by a guide block 74, which, in turn, longitudinally reciprocates or slides along a guide rod 75 which has its ends secured to opposed end plates of the drive module 50. A pair of rods, namely pull rod 76 and piston rod 77 each has a first end releasably secured to one of a pair of connectors associated with said guide block. These two first rod ends face each other. Drive module 50 also carries a pair of threaded stops 51 spaced apart to limit rotation to 90°, adjusted in a conventional manner. The second end of piston rod 77 is secured to reciprocating piston 78. This piston reciprocates within and sealingly engages the internal surface of power cylinder 10. Such power cylinder includes oppositely disposed end plates 11 and 12, and the cylinder is made unitary by tie rods 13 which threadedly engage the said end plates. End plate 11 includes a breather aperture 14 for accommodating a breather device (not shown) which equalizes pressure with atmosphere in advance of piston 78 during the pressure stroke. Such breather may also receive fittings to connect with a fluid power supply. The other end plate 12 includes a pressure port 15 to receive a fitting connecting said port to a source of fluid under pressure. To this point the art described is old. The second end of pull rod 76 is linked to spring guide cup 91 which, in turn, depends from spring guide seat 90 via a transitional portion 92. Said spring guide seat 90 is annular in configuration and includes a plurality, preferably 4, of reduced thickness portions 93 for receiving spring guide bearings 94 (see FIG. 1).

Spring return cylinder 30 has its open ends, respectively, closed by inner end cap plate 95 and outer end cap 96. The latter member is centrally apertured at 97. This opening 97, providing access to the interior, is removably sealed by cover plate 98 and o-ring seal 99. Opposite thereto, inner end cap plate 95 is also centrally apertured at 100, said opening being secured by inner end cap hub 101 which may be welded to said plate 95. A central opening 102 through hub 101 is annularly recessed to receive bushing 103. This bushing, in turn, reciprocatingly accommodates pull rod 76.

Spring 110 circumscribes pull rod 76 and cup 91, to be seated against end cap plate 95 and spring guide seat 90. The web portion 111 of cup 91 includes annular lip 112 with axial aperture 113 through said web and lip. Circumscribing said axial aperture is a axial hexagonal or polihedral depression 114, comprising a female fastener, shown to communicate between the interior cavity 115 of cup 91 and axial aperture 113.

The threaded second end of pull rod 76 carries hexagonal jam nut 116, comprising a male fastener. Said second end includes a tool receiving bore 117. Said jam nut may be removably seated within hexagonal depression 114.

Said first end of pull rod 76 is internally threaded at 118 and exteriorly grooved at 119 to receive a retainer ring.

During assembly, or attachment of the spring return cylinder 30 to the drive module, inner end cap hub 101 would be pin connected to the drive module's adjacent end plate. The first end of pull rod 76 would be inserted through aperture 102 and threadedly engaged with the threaded stub 191 of a connector associated with guide block 74. Then, a tool would be inserted through aperture 97 in outer end cap 96, to enter tool receiving bore 117 in the pull rod's second end. The pull rod is rotated, so as to align jam nut 116 with depression 114, and axial force is applied to said tool, causing the jam nut to be seated in the depression. Then, on removing the tool, reattaching cover plate 98 to end cap 96, and applying fluid pressure to the power cylinder through pressure port 15, the actuator is once again operative.

Figure 2:
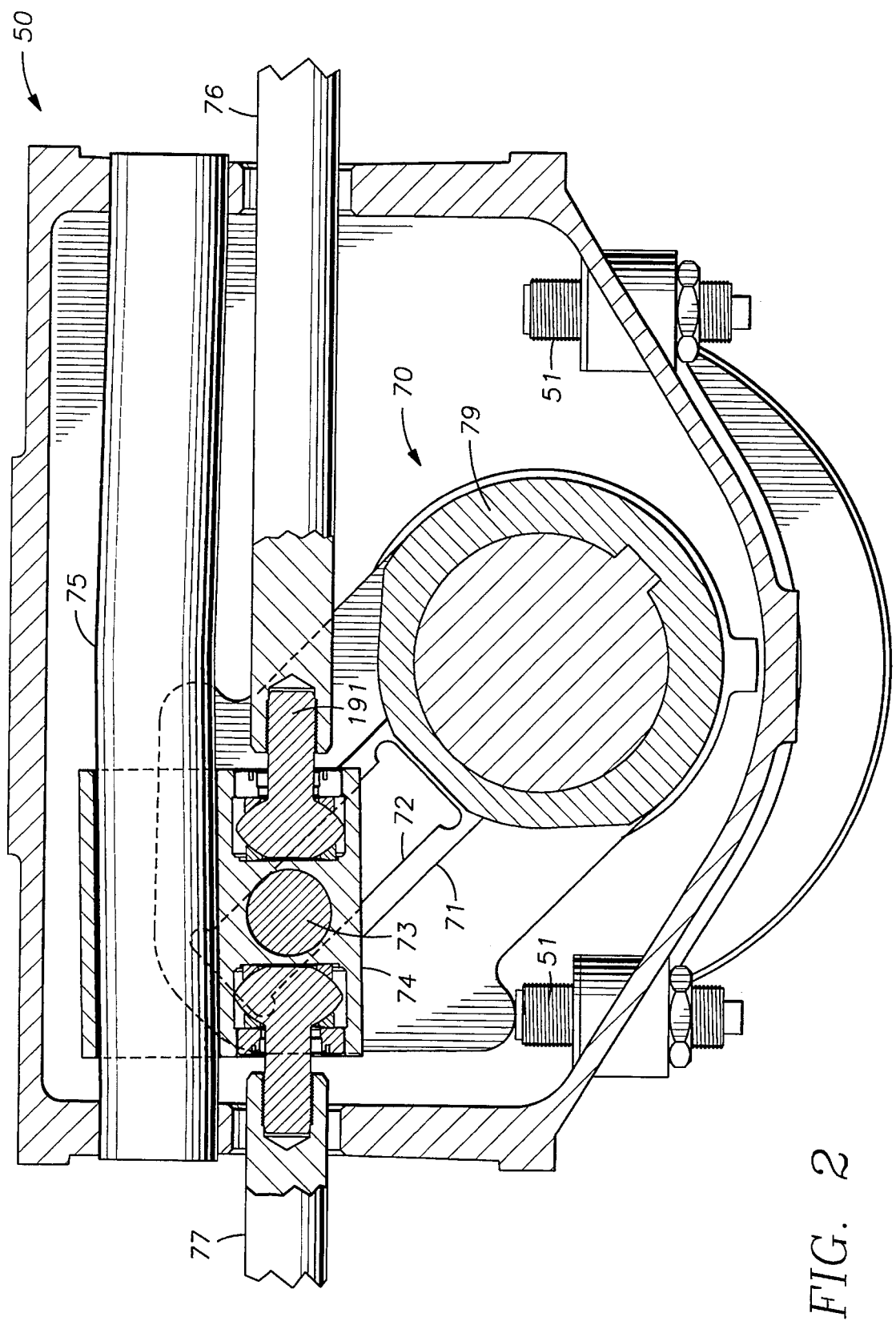
FIG. 2 is a section through the drive module.
Figure 3:
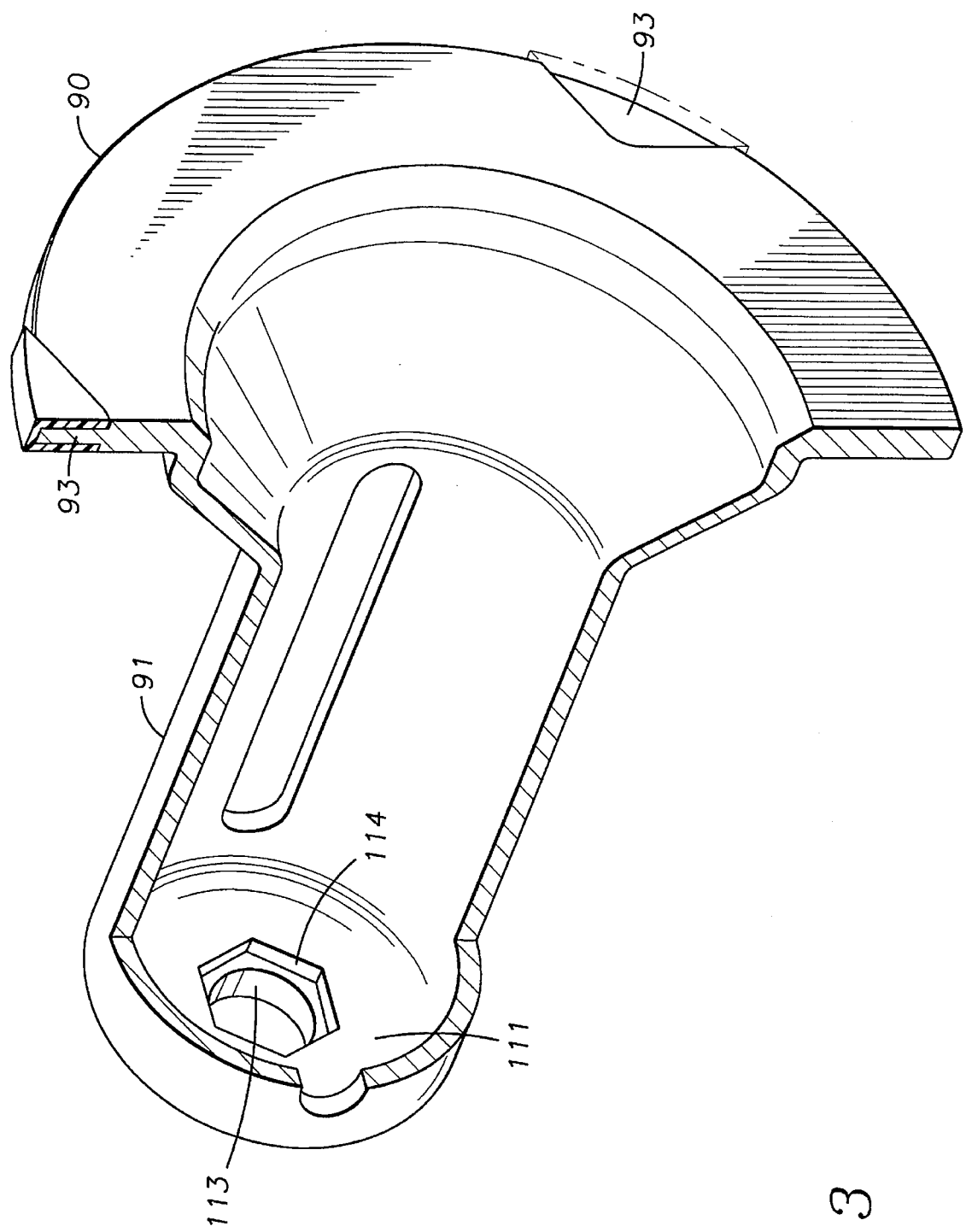
FIG. 3 is a broken perspective of the spring guide.
Figure 4:
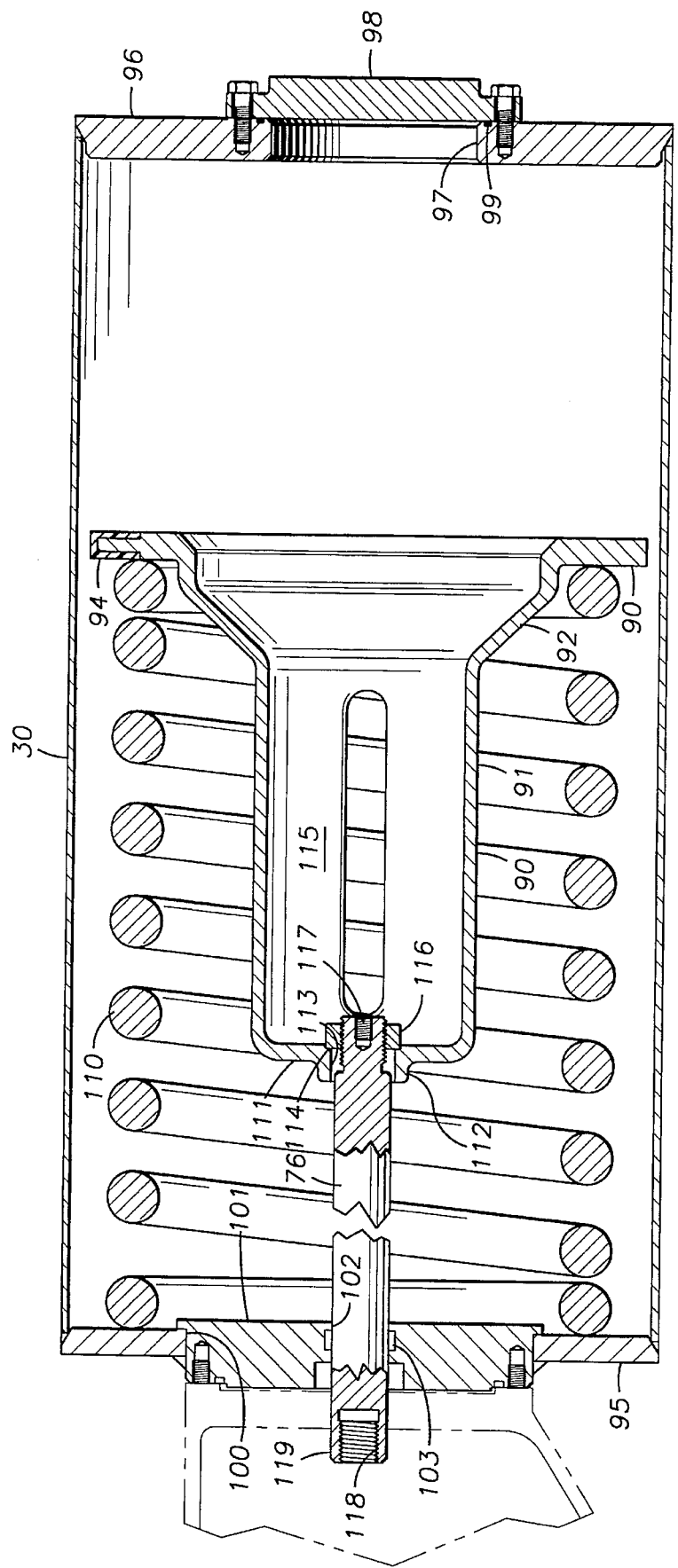
FIG. 4, 5 and 6 are axial sections through the spring return module, depicting the spring guide in 3 different positions, i.e., the valve open, valve closed, and internal servicing positions.
Figure 5:
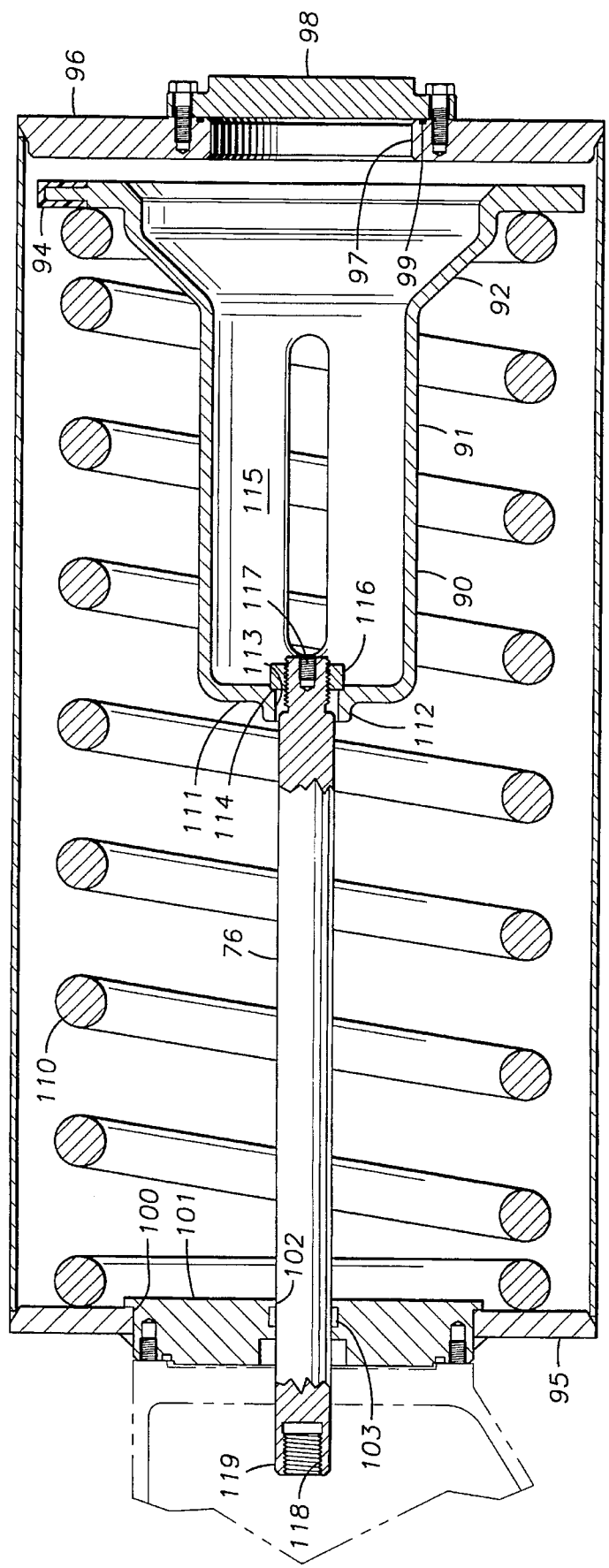
Figure 6:
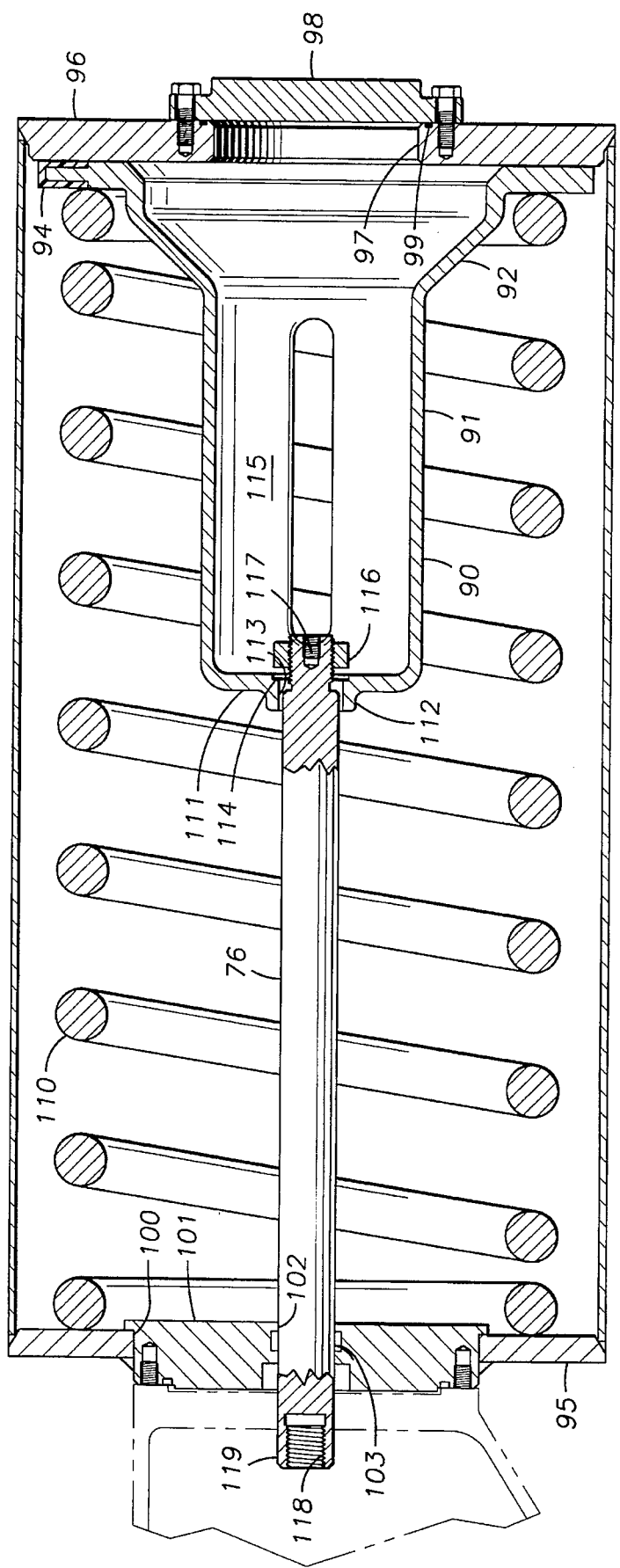

To remove the spring return cylinder 30, pressure is removed from pressure port 15, resulting in the spring guide moving from the valve open position of FIG. 4 limited by one stop 51 as shown in FIG. 2, to the valve closed position of FIG. 5, limited by the other stop 51, as shown in FIG. 1. This is the normal valve-closed position. To remove spring return cylinder 30 from the drive module 50, supply pressure is removed. Then, the stop mechanism 51 being utilized in the valve closed position of Figure 1 is further manipulated so as to permit the scotch yoke to rotate clockwise a further incremental amount. Then supply pressure is applied through aperture 14 to the opposite face of piston 78 from that normally used, i.e., applied to the left or down stream side, as depicted in FIG. 1. This urges spring guide flange or seat 90 solidly against outer end cap 96, and further urges pull rod to the extreme position of FIG. 6, with nut 116 removed from recess 114. Supply pressure may then be removed from port 14, cover plate 98 removed from end cap 96, a tool used to enter bore 117 to rotatingly remove it from connector 191, and extricate it from the spring cylinder 30. Following this, the bolts between the drive and spring module may be removed.

It is easy to note that during actuator operation, when the valve is open, the yoke is in the position opposite that shown in FIG. 1. The benefits of using a compression spring, rather than one in tension are apparent. The forces exerted during the power stroke tend to unify the actuator due to the then unitary nature of piston rod 77, guide block 74 and pull rod 76.

Although only a single embodiment has been described, it should be obvious that numerous modifications would be possible by one skilled in the art without departing from the spirit of the invention, the scope of which is limited only by the following claims.

We claim:

1. An improved spring return module, for use in a valve actuator, said module including:

a spring cylinder having opposed end covers;

coil spring means seated against one of said spring cylinder end covers and against a spring guide mechanism;

said spring guide mechanism including a seat for said coil spring means and said mechanism being movable between a valve-open first position and a no-spring-load second position, said spring guide mechanism having an intermediate valve-closed third position, said coil spring when under load, biasing said spring guide toward said second position, and further including means for releasably receiving a reciprocating pull rod;

a reciprocating pull rod;

combination means for preventing disengagement of said reciprocating pull rod and said spring guide mechanism when said coil spring is under load and allowing disengagement when not under load, said combination means comprising;

cooperative male and female fastener means, respectively provided said rod and spring guide for preventing relative rotation between said rod and said spring guide mechanism when said spring is under load; and means for facilitating movement of said spring guide mechanism from said third position to said second position whereat said disengagement may occur and wherefrom safe disassembly may be accomplished.

2. The module of claim 1 wherein said spring guide mechanism includes a cup portion with a web, said web having an axial, polyhedral depression therein, forming said female fastener means, said reciprocating rod carrying said male fastener means having a polyhedral configuration removably insertable within said female fastener means.

3. In a valve actuator having a spring return module, the combination of:

a drive module having a pin-driven yoke and pin-carrying guide means;

means for releasably linking said drive module guide means and a reciprocating pull rod carried by said spring return module; and said spring return module having;

a spring cylinder having opposed end covers;

coil spring means seated against one of said spring cylinder end covers and against a spring guide mechanism;

said spring guide mechanism including a seat for said coil spring means and said mechanism being movable between a first valve-open position and a no-spring-load second position, said spring guide mechanism having an intermediate valve-closed third position, said coil spring when under load, biasing said spring guide toward said second position, and further including means for releasably receiving said reciprocating pull rod;

said reciprocating pull rod;

combination means for preventing disengagement of said reciprocating pull rod and said spring guide mechanism when said coil spring is under load and allowing disengagement when not under load, said combination means comprising;

Cooperative male and female fastener means, respectively provided said rod and spring for preventing relative rotation between said rod and said spring guide mechanism when said spring is under load; and means for facilitating movement of said spring guide mechanism from said third position to said second position whereat said disengagement may occur and wherefrom safe disassembly may be accomplished.

4. The actuator of claim 3 wherein said spring guide mechanism includes a cup portion with a web, said web having an axial, polyhedral depression therein, forming said female fastener means, and said cup having an internal cavity within which at least part of said reciprocating rod may reciprocate, said reciprocating rod carrying said male fastener means, said male fastener means having a polyhedral configuration removably insertable within said female fastener means.

5. In a valve actuator having a power module, a spring return module and a drive module, the improvement comprising:

a piston member reciprocatingly positioned in said power module; piston rod linked at one end to said piston and at its other end to pin-carrying guide means, said pin-carrying guide means being movably positioned in said drive module;

said drive module having a pin-driven rotatable yoke and said pin-carrying guide means; and spring return module including;

a spring cylinder having opposed end covers;

coil spring means seated against one of said spring cylinder end covers and against a spring guide mechanism;

said spring guide mechanism including a seat for said coil spring means and said mechanism being movable between a valve-en first position and a no-spring-load second position, said spring guide mechanism having an intermediate valve-closed third position, said coil spring, when under load, biasing said spring guide toward said second position, and further including means for releasably receiving a reciprocating pull rod;

said reciprocating pull rod;

combination means for preventing disengagement of said reciprocating pull rod and said spring guide mechanism when said coil spring is under load and allowing disengagement when not under load;

said combination means comprising;

cooperative male and female fastener means, respectively provided said rod and spring guide, for preventing relative rotation between said rod and said spring guide mechanism when said spring is under load; and means for facilitating movement of said spring guide mechanism from said third position to said second position whereat said disengagement may occur and wherefrom safe disassembly may be accomplished.

6. The actuator of claim 5 wherein said spring guide mechanism includes a cup portion with a web, said web having a polyhedral depression therein, forming said female fastener means, said pull rod carrying said male fastener means which has a polyhedral configuration removably insertable, but not rotatable, within said female fastener means.

* * * * *

UNITED STATES PATENT AND TRADEMARK OFFICE
CERTIFICATE OF CORRECTION

PATENT NO.　:　5,601,110
DATED　　　:　FEBRUARY 11, 1997
INVENTOR(S):　MICHAEL E. REMBERT AND ROBERT W. MILNER

It is certified that error appears in the above-indentified patent and that said Letters Patent is hereby corrected as shown below:

In claim 5, the portion of said claim appearing at column 5, line 21, the term

"valve-en"

should read

-- valve-open --

Signed and Sealed this

Twenty-second Day of April, 1997

Attest:

BRUCE LEHMAN

*Commissioner of Patents and Trademarks*

*Attesting Officer*